3,226,678
VEHICLE SIGNAL LANTERN HAVING
SHOCK MOUNTING
Chester E. Dekko, Albion, and Rob Roy Glass, Rome
City, Ind., assignors to Lyall Electric, Inc., Albion,
Ind., a corporation of Indiana
Filed July 19, 1963, Ser. No. 296,179
8 Claims. (Cl. 340—119)

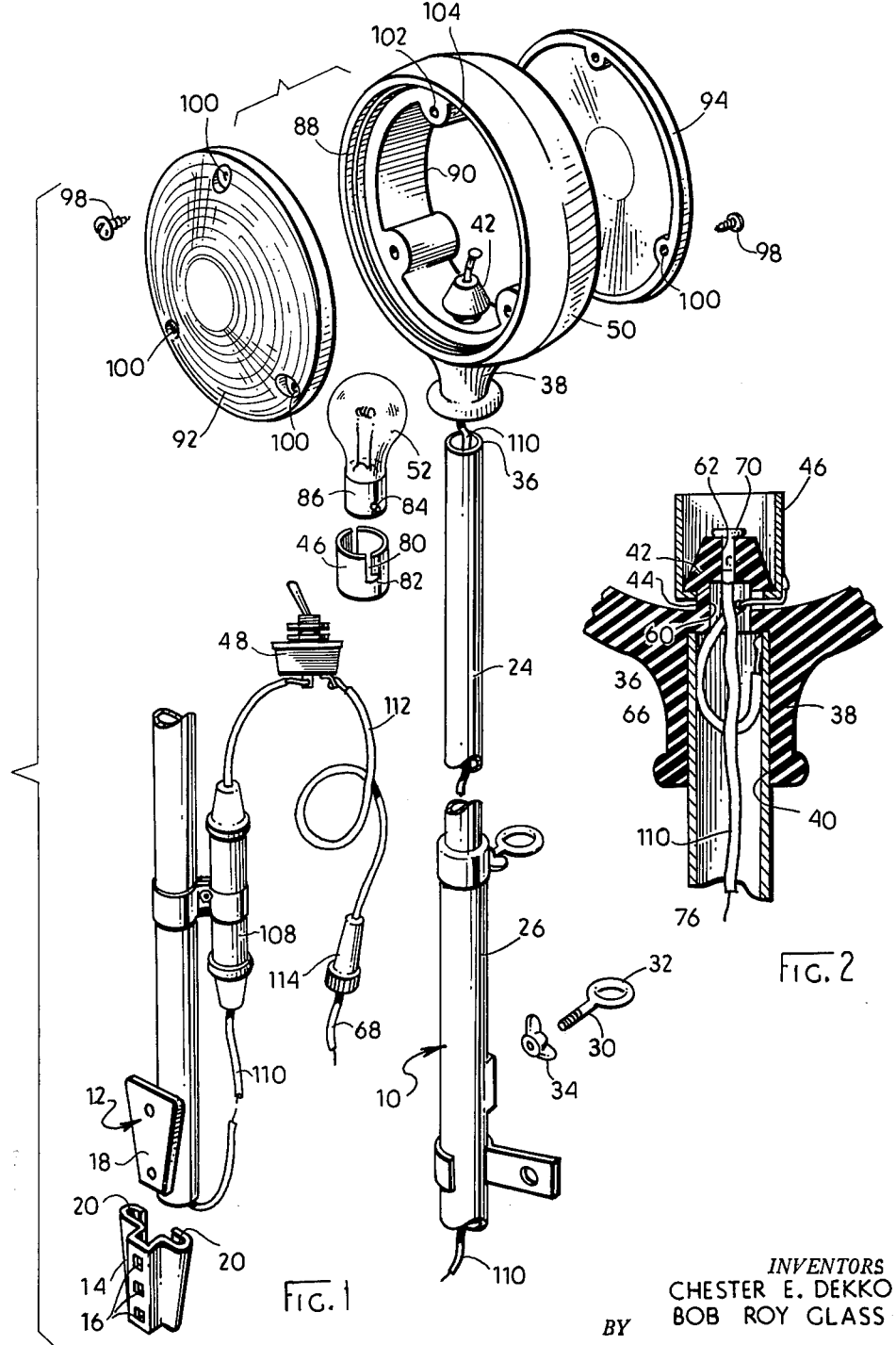

This invention relates to a vehicle signal and more particularly to a flasher signal which is used for slow moving vehicles to warn approaching and opposing traffic. The invention is useful on such vehicles as farm tractors, road tractors, snow removing vehicles, implement of husbandry, horse drawn vehicles, sweepers, graders and the like which move at slow speed and therefore present the need for proper highway signalling.

With signals of the class described, there is a tendency to break the fragile portions of the signal, particularly the flasher light housing and its components, for the reason that the signal must be extended upwardly in a prominent position to signal the traffic and for the same reason is exposed to impacts of various kinds, knocking against obstructions. That is, the components that are part of the light housing are vulnerable to damage and it extends into such positions that it can easily be damaged because it is relatively unprotected.

It is one of the objects of the present invention to provide a combination of means which coact to reduce the incidence of damage to signals by providing novel and improved mounting structure for the signal.

One of the important features of the present invention is that the mounting staff or the like is non-rigid; it is relatively flexible so that the upper end will bend back under impact thus reducing the likelihood of damage.

A further object of the present invention is to provide a resilient light housing so designed that the member which forms a connection between the light housing and the upper end of the non-rigid staff provides a mounting for the lamp and lenses whereby the lamp and lenses are cushioned, impacts are moderated so as to reduce the incidence of damage.

An overall object of the present invention is to provide a new and improved flasher signal which is relatively inexpensive, can be adjusted to an appropriate height for rendering a prominent flasher signal, and is economical to produce and to mount onto the vehicle.

Other objects and features of the present invention will become apparent from a consideration of the following description which proceeds with reference to the accompanying drawings, wherein:

FIGURE 1 is an exploded isometric view of the components which make up the flasher signal; and, FIGURE 2 is an enlarged sectional view of the mounting member which is an integral part of the light housing and which forms a connection between the light housing and staff.

Referring now to the drawing, a telescoping staff 10 is secured through a male mounting blade 12 and a female bracket 14 to a suitable part of the vehicle through mounting bolts (not shown) which are received through mounting openings 16. Thus, a portion 18 fits within channel 20 to allow for locking action because of their wedged shapes and allows for quick detaching of the flasher signal for ready transfer to other units and implements. The staff includes two tubular sections, an upper tubular section 24 and a lower tubular section 26 which receives the section 24 therein, the section 24 adapted to be raised or lowered and then being locked by a threaded lock stem 30 with a circular turning handle 32 and a locking nut 34 which maintains the relative positions of the tubular members.

At the upper end 36 of tubular section 24 is a rubber mounting member 38 having a recess 40 and boss 42, the recess 40 being proportioned to fit over the end 36 and forming a gripping connection therewith. The mounting member 38 is flexible, and in addition to the flexibility of the staff 10, provides a flexible support for the structure surmounting the mounting member 38.

A frustum conical boss 42 is formed integrally with the body portion of the mounting member 38 and includes a circular groove 44 which provides a snap-fit connection with lamp socket 46 (FIGURE 2). At the end 40 of the recess there is a stepped passage 60, 62 which permits conductors 66, 68 to pass therein. Conductor 68 terminates in a connection 70 with lamp 52 and ground conductor 66 is connected to the lamp socket 46 and upper end 36 of tubular section 24. The conductors include the usual insulation covering 76.

The lamp socket 46 has a slot 80 terminating at a transverse slot 82 so that prongs 84 on the sleeve 86 of the lamp 52 will pass down slot 80 and then into 82, locking the lamp 52 securely in place and in electrically conductive connection with 70 and ground 66 where a complete circuit is made effecting energization of lamp 52.

The lamp 52 is proportioned to fit between the open ends 88 and 90 of the light housing 50, the open ends being recessed to receive and protect substantially transparent colored lenses 92 and 94, the lenses 92 being "red" to signal the rearwardly approaching traffic and the lens 94 being "amber" colored to face the oncoming traffic. The lenses are fastened in place by screws 98 which pass through companion openings 100 recessed in the face of the plate. The screws 98 are passed into guide openings 102 which are constructed in bosses 104 spaced at 120° apart in both the lenses and light housing, respectively.

The lamp is periodically energized to repeat "on-off" sequences since this is found to be of greater attention-getting value than a steady light. For that purpose there is provided a make-brake or flasher 108 of conventional construction which includes an input energy source from a conductor 68, a conductor 110, a panel mount switch 48, a fuse 114 and conductor 112, leading to the lamp 52. The effect of operation of the flasher 108 is to cause the lamp 52 to periodically energize and deenergize thereby causing the lamp to operate in an "on-off" sequence.

In operation, the relatively fragile lamp 52, lenses 92 and 94 of light housing assembly are protected in numerous ways from breakage, including the yieldable nature of the staff 10, which, in the event that the lenses 92 or light housing 50 impacts against an obstruction will cause the whole structure to bend or at least to soften the impact.

The mounting member 38 by reason of its resilient connection with the end 36 cushions any blows against the lenses 92, 94, light housing 50, and lamp 52, and the lamp 52 in turn within the envelope of the light housing 50 is itself protected by reason of mounting on a lamp socket 46, which is disposed on a flexible boss 42. There are thus a series of flexible articulations including the staff 10, mounting member 38 and boss 42 all of which combine to cushion the lamp 52 and lenses 92, 94, and to soften the effect of impacts.

Consequently, it has been found that the lamp and lenses do not need to be changed or repaired nearly as often in spite of the fact that the flasher signal is prominently located in a position which is exposed and is often subject to being struck. It has been found that the damage-reduction is significant and produces substantial economy and adds a factor of safety because the flasher signal is now continuously operative and is less likely to be broken during a time when its operation is essential.

Although the present invention has been illustrated and described in connection with certain example embodiments, it will be understood that these are illustrative of the invention and are by no means restrictive thereof. It is reasonably to be expected that those skilled in this art can make numerous revisions and adaptations of the invention but it is intended that such revisions and adaptations will be included within the scope of the following claims as equivalents of the invention.

We claim:

1. A signalling device adapted for mounting on vehicles and the like, and comprising:
 (a) a flexible staff adapted for mounting to the vehicle and extending upwardly to mount a light signal housing at the upper end thereof;
 (b) a flexible mounting member having a neck adapted to fit over the upper end of said staff and including a gripping connection adapted to receive a part of said staff;
 (c) a flexible boss portion of said mounting member which is spaced from the main body of the mounting member by a circular groove;
 (d) a socket sleeve adapted to fit over the boss and snap within the groove which extends within the inner periphery of said light housing;
 (e) a lamp for fitting within said socket sleeve and proportioned to fit between the open ends of said light housing and being energized to provide illumination; and
 (f) two substantially transparent lenses which fit over the open ends of said light housing to enclose the space wherein said lamp is mounted.

2. A signalling device adapted for mounting on vehicles and the like, and comprising:
 (a) a flexible staff adapted for mounting to the vehicle and extending upwardly to mount a light signal housing at the upper end thereof;
 (b) a flexible mounting member having a neck adapted to fit over the upper end of said staff and including a gripping connection adapted to receive a part of said staff;
 (c) a flexible boss portion of said mounting member which is spaced from the main body of the mounting member by a circular groove;
 (d) a socket sleeve adapted to fit over the boss and snap within the groove which extends within the inner periphery of said light housing;
 (e) a lamp for fitting within said socket sleeve and proportioned to fit between the open ends of said light housing and being energized to provide illumination;
 (f) two substantially transparent lenses which fit over the open ends of said light housing to enclose the space wherein said lamp is mounted; and,
 (g) conductors extending upwardly through said flexible staff, flexible grommet boss, and said socket sleeve for electrical connection with the lamp to communicate electrical energy whereby said lamp serves as a flasher signal.

3. A signalling device adapted for mounting on vehicles and the like, and comprising:
 (a) a flexible staff adapted for mounting to the vehicle and extending upwardly to mount a light signal housing at the upper end thereof;
 (b) a flexible mounting member having a neck adapted to fit over the upper end of said staff and including a gripping connection adapted to receive a part of said staff;
 (c) a flexible boss portion of said mounting member which is separated from the main body of the grommet by a circular groove;
 (d) a socket sleeve adapted to fit over the boss and snap within the groove which extends within the inner periphery of said light housing;
 (e) a lamp for fitting within said socket sleeve and proportioned to fit between the open ends of said light housing and being energized to provide illumination; and,
 (f) two substantially transparent lenses which fit over the open ends of said light housing to enclose the space wherein said lamp is mounted;
 (g) and mounting means between the vehicle and said staff to locate the flasher light in a preferred vertical location; and,
 (h) means for locking said mounting means in place.

4. A flasher signal for slow moving vehicles such as tractors, snow plows and the like which are adapted for movement on public highways, comprising:
 (a) a vertical flexibly mounted staff having a connection at the end thereof for securement with said vehicle;
 (b) a flexible member including a recess which forms a cushioned grip connection with the upper end of said staff;
 (c) a light housing integral with a portion of said flexible member;
 (d) a lamp socket adapted to snap-fit over the resilient portion extending within said light housing and adapted for limited resilient movement relatively to said light housing to cushion the socket against impacts;
 (e) a lamp which is received within said socket and is electrically energized periodically to emit an on-off signal; and,
 (f) at least partially transparent shielding means for covering the open ends of said light housing and enclosing the space wherein said lamp is mounted.

5. A mounting structure for fragile articles such as lamps and the like, comprising:
 (a) a yieldable rubber-like mounting member means having a recess which is adapted to receive a mounting structure whereon said mounting member is resiliently movable;
 (b) a flexible boss portion of said mounting member including a groove which forms a snap-fitting connection for supporting a lamp socket and which provides for limited resilient cushioned movement of the boss relatively to the body of the mounting member.

6. A mounting structure for fragile articles, such as lamps and the like, comprising:
 (a) yieldable rubber-like mounting member means having a recess which is adapted for receiving a mounting structure whereon said mounting member is resiliently movable;
 (b) a flexible boss portion of said mounting member including a groove which forms a snap-fitting connection and which provides for limited resilient cushioned movement of the boss relatively to the body of the mounting member;
 (c) a lamp socket with an opening proportioned to provide snap-fitting of the lamp socket over said flexible boss and into snap-fitting relation with said groove; and,
 (d) a light housing including a mounting portion to receive said lamp socket therein.

7. A flasher signal for slow moving vehicles such as tractors, snow plows and the like which are adapted for movement on public highways, comprising:
 (a) a flexible vertical staff having a connection at one end thereof for securement with said vehicle;
 (b) a flexible member including a recess which forms a cushioned grip connection with the upper end of said staff;
 (c) a light housing with an opening for receiving said flexible member;
 (d) means forming a projection in said mounting member which extends within the light housing;
 (e) a lamp socket adapted to snap-fit over the resilient portion extending within said light housing and adapted for limited resilient movement relatively to said light housing to cushion said socket against impacts;
(f) at least partially transparent shielding means for covering the open ends of said light housing and enclosing the space wherein said lamp is mounted;
(g) passage means extending through said mounting member; and,
(h) electrical conductors extending through said passage means to provide electrical energization for said lamp.

8. A flasher signal for slow moving vehicles such as tractors, snow plows and the like which are adapted for movement on public highways, comprising:
(a) a flexible vertical staff having a connection at one end thereof for securement with said vehicle;
(b) a flexible member including a recess which forms a cushioned grip connection with the upper end of said staff;
(c) a mounting member with an opening for receiving said flexible member;
(d) means forming a projection in said mounting member which extends within the light housing;
(e) a lamp socket adapted to snap-fit over the resilient portion extending within said light housing and adapted for limited resilient movement relatively to said light housing to cushion said socket against impacts;
(f) at least partially transparent shielding means for covering the open ends of said light housing and enclosing the space wherein said lamp is mounted;
(g) passage means extending through said mounting member; and,
(h) electrical conductors extending through said passage means to provide electrical energization for said lamp.

References Cited by the Examiner
UNITED STATES PATENTS

| | | | |
|---|---|---|---|
| 2,220,515 | 11/1940 | Foute | 339—125 |
| 2,263,061 | 11/1941 | Allen | 340—119 |
| 2,694,798 | 11/1954 | Cole | 339—126 |
| 2,937,362 | 5/1960 | Hartnett | 340—87 |
| 2,988,725 | 6/1961 | Vallee | 339—126 |
| 3,076,950 | 2/1963 | Pavlick | 339—125 |
| 3,114,129 | 12/1963 | Gilbert | 340—87 |
| 3,122,736 | 2/1964 | Weber | 340—119 |

NEIL C. READ, *Primary Examiner.*